(12) United States Patent
Hixon

(10) Patent No.: US 6,955,228 B2
(45) Date of Patent: Oct. 18, 2005

(54) TOOL WITH ROTATABLE HANDLE GRIP

(76) Inventor: William K. Hixon, 10343 Amity Rd., Boise, ID (US) 83709

(*) Notice: Subject to any disclaimer, the term of this patent is extended or adjusted under 35 U.S.C. 154(b) by 0 days.

(21) Appl. No.: 10/921,464

(22) Filed: Aug. 18, 2004

(65) Prior Publication Data

US 2005/0023011 A1 Feb. 3, 2005

Related U.S. Application Data

(63) Continuation of application No. 10/101,818, filed on Mar. 19, 2002, now Pat. No. 6,796,383, which is a continuation-in-part of application No. 09/537,898, filed on Mar. 28, 2000, now Pat. No. 6,401,833.

(51) Int. Cl.⁷ .................................................. A01B 1/00
(52) U.S. Cl. ....................................................... 172/378
(58) Field of Search .............................. 172/370, 371, 172/375, 378; 56/201; 111/7.1–7.4, 8; 294/49, 50.1, 51, 57, 58

(56) References Cited

U.S. PATENT DOCUMENTS

| 838,100 | A | 12/1906 | Gilbert |
|---|---|---|---|
| 2,279,747 | A | 4/1942 | Brandeberry |
| 2,299,378 | A | 10/1942 | Cain |
| 2,378,459 | A | 6/1945 | Beardsley |
| 2,531,227 | A | 11/1950 | Lubins |
| 2,780,976 | A | 2/1957 | Koering |
| 2,843,359 | A | 7/1958 | Franz et al. |
| 2,909,385 | A | 10/1959 | Meredich |
| 2,928,655 | A | 3/1960 | Armstrong |
| 3,458,981 | A | 8/1969 | Banner |
| 4,787,661 | A | 11/1988 | Rutledge |
| 4,794,667 | A | 1/1989 | Nelson et al. |
| 4,999,057 | A | 3/1991 | Peterson |
| 5,447,349 | A | 9/1995 | Coble |
| 5,915,794 | A | 6/1999 | Neff |
| 6,401,833 | B1 | 6/2002 | Hixon |
| 6,796,383 | B2 | 9/2004 | Hixon |

OTHER PUBLICATIONS

Advertising Catalog #1922, cover page and p. 15. Believed published in Jun. 2002, Harbor Freight Tools, 3491 Mission Oaks Blvd., Camarillo, CA 93011–6010.

*Primary Examiner*—Robert E Pezzuto
(74) *Attorney, Agent, or Firm*—Townsend & Townsend & Crew LLP; Nathan S. Cassell

(57) ABSTRACT

A tool having a rotatable handle grip includes an elongated handle having a first end and second end, wherein a handle grip is rotatably coupled with the first end, and a working end is coupled with the second end. The working end may include a plurality of spaced tines with the prongs having points, wherein at least one cutting blade is coupled to the device between adjacent tines allowing a user to slide the tines of the fork along the ground surface, thereby using the blade to harvest vegetation. Additionally, the working end allows a stack of cut vegetation to accumulate on the device to be carried and placed in a preferred location or container.

27 Claims, 5 Drawing Sheets

100## TOOL WITH ROTATABLE HANDLE GRIP

CROSS REFERENCES TO RELATED APPLICATIONS

This application is a continuation of U.S. patent application Ser. No. 10/101,818 filed on Mar. 19, 2002, now U.S. Pat. No. 6,796,383, which is a continuation-in-part of U.S. patent application Ser. No. 09/537,898, filed Mar. 28, 2000, now U.S. Pat. No. 6,401,833, the full disclosures of which are incorporated herein by reference.

BACKGROUND OF THE INVENTION

1. Field of the Invention

The present invention generally relates to tools having handle grips, and more particularly to cultivating or harvesting tools having rotatable handle grips.

2. Background Information

Hand held tools are used to perform a wide variety of functions. For example, these implements are commonly used in outdoor applications, and particularly in the fields of farming, landscaping, digging, excavating, gardening, and cultivation. Unfortunately, such tools often force the user to have their hands in an unergonomic position. Examples of hand held tools include rakes, shovels, hoes, spades, pitchforks, scythes, scoops, and the like. One particular hand held tool is a weed and plant harvesting tool.

Weed and plant harvesting devices are known in the art. For instance, U.S. Pat. No. 2,909,385 to Meredich shows a garden tool. The Meredich device has spaced parallel and perpendicular blades for digging and breaking apart the soil.

U.S. Pat. No. 2,843,359 to Franz et al. shows a weed digging tool having a blade with a v-shaped notch which is inserted into the ground and lifted upwards so that the weed is pulled out roots and all from the ground. Like many weed pullers, this device uses leverage to extract a weed by lifting it.

U.S. Pat. No. 2,928,655 to Armstrong shows a weed puller. The Armstrong device straps onto a wearer's shoe and contains a v-shaped blade which is inserted into the ground and tilted upwards so that the weed is lifted up roots and all.

U.S. Pat. No. 2,279,747 to Brandeberry shows a weeding tool for grasping weeds and pulling them out by the roots.

And finally, U.S. Pat. No. 2,378,459 to Beardsley shows a weeding tool for insertion in the ground and prying upwards thereby pulling up the weed by its roots.

What is needed is a hand tool with a handle grip that does not force the user to hold the tool in an unergonomic position. Accordingly, the tool preferably includes a rotatable handle that can be rotated to a desired or otherwise ergonomically favorable position. The tool may be a plant harvesting device having a harvesting means used to cut and remove vegetation without pulling the vegetation out by its roots. The tool may also be configured to cut vegetation off at or near the surface of the ground, with the ability to accumulate a quantity of cut plants for eventual collection. The tool may further be configured to provide a variable angle of attack, so that the tool may slid along the ground and strike the stems of plants near the ground, cutting them off.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF SUMMARY OF THE INVENTION

The present invention provides a hand held tool, such as a plant harvesting device, that has a rotatable handle grip. The rotatable handle grip provides the tool user with the convenience and advantage of adjusting the orientation of the handle grip, thus allowing the user to hold the tool in an ergonomically favorable or otherwise desirable position.

In a first aspect, the present invention provides a tool comprising an elongated handle having a first end and a second end, a working end coupled with the second end, and a handle grip rotatably coupled with the first end. The handle grip can be rotatable about a longitudinal axis of the handle. The elongated handle first end may also include a handle pin extending therefrom, and the rotatable handle grip may have a handle grip aperture adapted to receive the handle pin therein. The rotatable handle grip may be fixable. The rotatable handle grip can be secured to the handle with a handle grip clamp. The working end may also have a harvesting head comprising a plurality of elongated, curved tines arranged in a side by side configuration. Each tine can have a first end, a second end, and a middle portion, and the plurality of tines may have generally parallel middle portions and generally parallel first ends, and the second ends can join to adjacent tine second ends and may be coupled with the elongated handle. In a related aspect, the invention also includes a working end handle grip that can be rotatably coupled to the handle.

The present invention may also include at least one cutting blade interposed between adjacent tines. The invention may also have a bar coupled with the at least one cutting blade, and may also have a reinforcing rod coupled with the bar and with the second end of at least one tine. The bar can stabilize the cutting blade, and also can absorb stress received by the cutting blade during use. Additionally, the bar can support or hold plant material which has been severed by the cutting blade.

In a second aspect, the present invention provides a tool comprising an elongated handle having a first end and a second end. A handle grip is rotatably coupled with the first end, and a harvesting head is coupled with the second end. The harvesting head includes a plurality of elongated, generally curved tines arranged in side by side configuration, and each of the tines has a first end, a second end and a middle portion. The tines have generally parallel middle portions and generally parallel first ends. The second ends join to adjacent tine second ends and connect to the elongated handle, wherein there is interposed between and inferior to adjacent tines at least one cutting blade for harvesting vegetation, and a bar coupled to the at least one cutting blade and directed at an angle from the plurality of tines. The harvesting head may also include a reinforcing rod coupled to the bar and to the second end of at least one tine. The elongated handle first end may also include a handle pin extending therefrom, and the rotatable handle grip can have a handle grip aperture adapted to receive the handle pin therein. The rotatable handle grip can be fixable. The rotatable handle grip may be secured to the handle with a handle grip clamp. The handle grip can be rotatable to an 18 degree angle, relative to an axis defined by the longitudinal orientation of the bar.

In a third aspect, the present invention provides a plant harvesting device that includes an elongated handle having a first end and a second end, a working end coupled with the second end, and a handle grip rotatably coupled with the first end, wherein the working end includes: a fork having a plurality of spaced tines, the tines having points, and the fork having a handle; a blade attachment means for attaching at least one blade inferior to the tines of the fork, the blade attachment means extending between at least two tines; a reinforcing rod coupled to the blade attachment means and to a second end of at least one tine; and at least one blade with a cutting edge, the blade connecting to the blade attachment means, the blade cutting edge oriented toward said points of the tines. The elongated handle first end can also include a handle pin extending therefrom, and the rotatable handle grip may include a handle grip aperture adapted to receive the handle pin therein. The rotatable handle grip can be fixable. The rotatable handle grip can be secured to the handle with a handle grip clamp.

In a fourth aspect, the present invention provides a bean harvesting device for harvesting beans. The device can include an elongated handle having a first end and a second end, a working end coupled with the second end, and a handle grip rotatably coupled with the first end, wherein the working end includes a fork having a plurality of spaced tines, the tines having points; a handle attached to the fork, the handle comprising a D-shaped handle attached at an 18 degree angle from the fork; a blade attachment means for attaching at least one blade inferior to said tines of said fork, the blade attachment means extending between at least two tines, wherein the blade attachment means comprises: a top bar, the top bar having a plurality of holes therethrough for receiving a plurality of fasteners; and a bottom bar, the bottom bar having a plurality of holes therethrough for receiving the plurality of fasteners; a reinforcing rod coupled to the top bar and to a second end of at least one tine; wherein the blade attachment means attaches to the fork by securing with the fasteners the tines between the top bar and the bottom bar, with the top and bottom bars generally perpendicular to the tines; and at least one blade, the blade connecting to the blade attachment means inferior to the tines, the blade having cutting surfaces oriented generally obliquely to the tines.

In a further preferred embodiment, the device has an elongated handle which attaches to a harvesting means. This harvesting means has a plurality of elongated, generally curved guide means arranged in side by side configuration. Generally between at least two adjacent guide means is located at least one cutting means for cutting and harvesting vegetation. It is preferred that the harvesting means further comprises a harvesting tray for holding harvested vegetation until the user dumps said harvested vegetation from said tray.

In another embodiment, the device is a fork having a handle and a plurality of widely spaced prongs. A blade attachment means, for attaching at least one blade, adjustably attaches to the fork, preferably extending between at least two of the prongs. At least one blade connects to this blade attachment mean.

In another embodiment, the device is an attachment for a standard pitchfork. The device being comprised of two main pieces, a top bar and a bottom bar, which includes the pusher, collector, and clamping piece. The bottom bar has affixed to it the required number of cutting means as well as the fastening devices. The top bar is formed with a 90 degree angle iron to both clamp the unit together and to provide the pushing, collecting and snapping effect (as weed bends back it hits the top angle iron and tends to snap). It also has a little weight which adds energy to the thrust. The bottom bar, which is comprised of the bar and cutting sections, is clamped to the fork on the tines. It is positioned at the bend to allow the sharpened sections to protrude in a downward fashion. The angle of attack can be determined by the operator, by moving the handle up or down. This device cuts off plants in one thrust and is particularly useful for harvesting beans. The bean plants are snapped off by the thrust. The cutting edge of the sections must be against the tines of the fork and the plant can be captured from the sharp edge of the section as well as in the crotch between the sections. The device is used to harvest vegetation and does so by the forward thrusting of the pitchfork. The tines of the pitchfork slide along the ground and the points of the times do not dig into the ground. By rocking the pitchfork up and down the angle of attack of the pitchfork tines is adjusted so that they scoot along the ground rather than dig in. The triangular blades can be moved backward and forward to achieve the right angle for the particular job. The tines of the pitchfork slide along the ground, plants are captured by the triangular blades of the cutters. The plants are captured at ground level. As this device is thrust forward, a mat of harvested plants accumulates and builds up on the angle iron. Periodically the stack of plants which builds up on the angle iron is removed to clear the device.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects ail without departing from the invention. Accordingly, the drawings and description of the preferred embodiment are to be regarded as illustrative in nature, and not as restrictive.

DETAILED DESCRIPTION OF THE INVENTION

Figure 1:
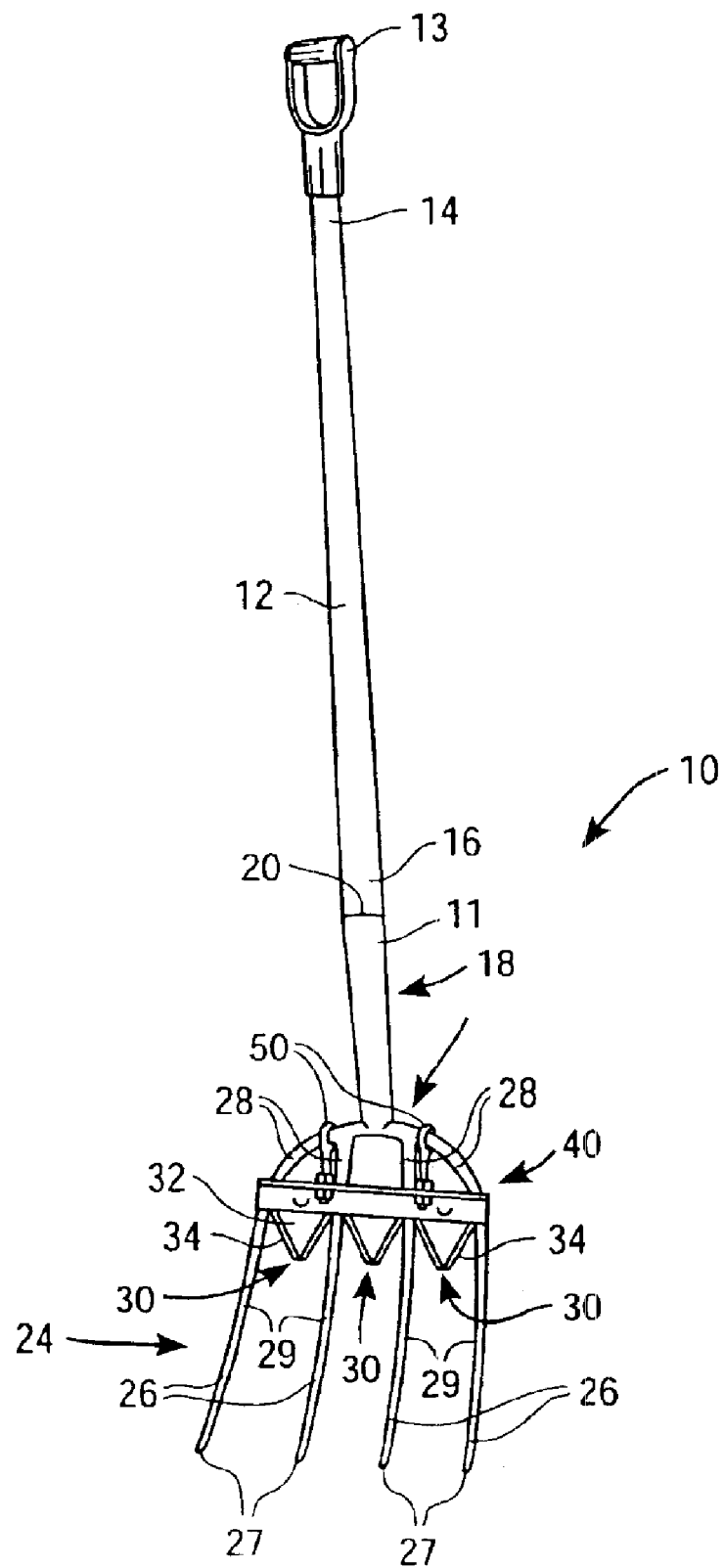
FIG. 1 is a perspective view of the preferred embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention provides a handle grip for a hand tool, such as a plant harvesting device. The preferred embodiment of the present invention is shown in FIG. 1. FIG. 1 shows the plant harvesting device 10 comprising an elongated handle 12 attaching to a working end, such as a fork 11. The elongated handle 12 has a first end 14 and a second end 16. The handle 12 attaches to the fork 11 through a handle attachment means 18. This handle attachment means 18 can be through inserting the second end 16 of the handle 12 into the handle receiving orifice 20 of the handle attachment means 18 or by any other means.

FIG. 1 also shows a handle grip 13 for assisting in the use of the device 10. The handle grip 13 is preferably rotatably coupled with the handle. The handle grip may also be fixedly attached to the handle 12, preferably in a slightly rotated orientation. The preferred rotation is eighteen degrees, however, other degrees may also be suitable. The rotation shown is for a left handed user, and an opposite rotation would be in line for a right handed user. This configuration of handle allows the device to be used in an ergonomically advantageous way.

With the rotated handle shown in FIG. 1, a user's right hand would grip the handle somewhere in midshaft, and would support the weight of the handle and attached device by the strong bicep muscle. The left hand would grip the handle grip 13 so that the palm is facing the tool. When force is applied to the tool with the left hand, the force through the wrist would flex the palm toward the users body, a comfortable movement. If the user's left hand were on a handle without a handle grip, it would be less favorable, because the palm would be down, the back of the hand would be up, the fingers would be wrapped around the handle, and the wrist would have to flex in a lateral motion as force was applied to the tool. This would cause fatigue, if not injury.

The fork 11 comprises the handle attachment means 18, a guide means attachment means 22, a harvesting means 24, guide means or prongs 26 and at least one sharp cutting means 30. The guide means attachment means 22 attaches the guide means or prongs 26 to the handle 12 and/or the handle attachment means 18. From the guide means attachment means 22, the guide prongs 26 extend there away from so that the prongs 26 have second ends 28 that join to the guide means attachment means 22; middle portions 29 which are generally parallel and arranged in a side by side arrangement; and first ends or points 27 which are also arranged in a generally parallel side by side arrangement.

The harvesting means 24 is the part of the device 10 which harvests vegetation. This harvesting means, in the preferred embodiment, comprises the guide means 26 and the sharp means 30.

Figure 3:
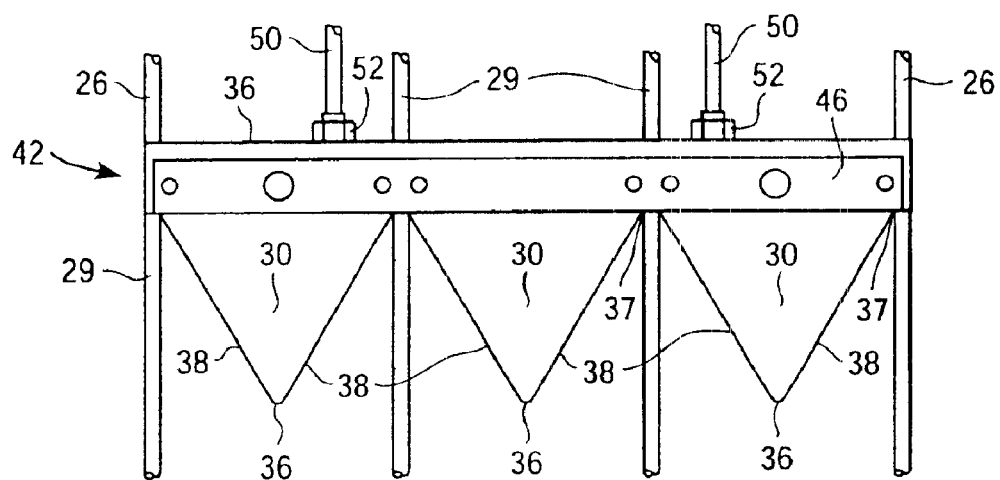
FIG. 3 is a partial bottom view of the harvesting means of one embodiment of the present invention.

Attaching to and generally extending between the prongs 26 are a plurality of cutting means 30. The preferred cutting means 30 are blades 32 as shown in FIG. 1. The preferred blades 32 have two cutting sides or surfaces 38 (as shown in FIG. 3). While in the preferred embodiment there is one cutting means generally between each adjacent guide means 26, it would also be possible to have a plurality of cutting means 30 between adjacent guide means 26. The harvesting means 24 further comprises a harvesting tray 40 for collecting the cut and harvested vegetation so that the user may cut a plurality of plants with the stalks of the plants piling up against the harvesting tray 40 so that the user may harvest a row of vegetation and turn the device 10 over and dump that same harvested vegetation into a pile or container. The harvesting tray 40 is reinforced through use of reinforcing rods 50. These rods 50 keep the harvesting tray 40 stable when being thrust into vegetation to be cut.

Figure 2:
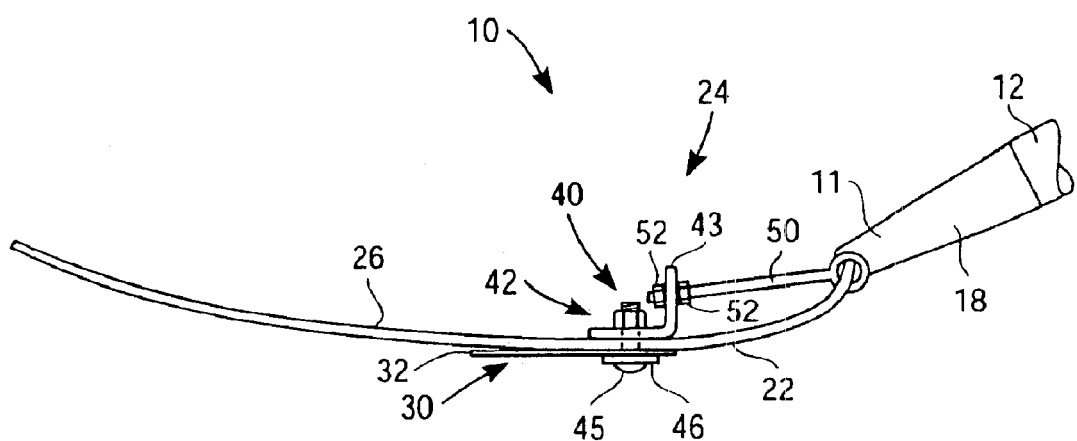
FIG. 2 is partial side view of the another embodiment of the present invention.

Referring now to FIG. 2, a partial side view of another embodiment of the present invention is shown. In this view, we can see the elongated handle 12 as it attaches to the fork 11. This view particularly shows the harvesting means 24. In this embodiment, the cutting means 30 is shown attached slightly below the guide means 26. It is to be understood that these cutting means 30 would still be spaced generally in between adjacent guide means or prongs 26. In this embodiment we can see the harvesting means 24 further comprises a top bar 43. The preferred top bar 43 is a length of standard angle iron. This top bar has a plurality of holes extending therethrough for receiving fastener means 45 such as the nut and bolt shown. This fastener means 45 will also be able to extend through holes (not shown) extending through the blade 32 of the cutting means 30. This is done so that the cutting means 30 can be rigidly attached to the prongs 26. The blade attachment means 42 is used to attach the cutting means 30 to the guide prongs 26. The top bar 43 assists in defining and creating the basis for the harvesting tray 40 so that when vegetation is cut by the cutting means 30, the stalks of said vegetation will fall and rest upon the top bar 43 until the user takes the device and dumps the cut vegetation off of it. As shown in FIG. 1, the harvesting tray 40 is reinforced through use of reinforcing rods 50. The preferred rods 50 are eye-bolts which attach through a hole in the top bar 43 through nuts 52.

FIG. 3 shows a bottom view of another embodiment of the harvesting means 24. In this embodiment, one can see the plurality of side by side guide means or prongs 26. In this embodiment we can see one cutting means 30 located between each adjacent guide means 26. These cutting means 30 preferably have cutting sides 38 which are obliquely angled to the guide prongs 26. These cutting sides 38 provide the cutting surface for the cutting means 30. The blade attachment means 42 is used to attach the cutting means 30 to the guide prongs 26. It is preferred that the tips of these cutting means 30 be slightly rounded. The bottom bar 46 attaches through use of the fastener means 45 to the cutting means 30. As in the preferred embodiment, the guide means 26 extends between the cutting means 30 and bottom bar 46 in this fashion.

Alternatively, the cutting means 30 may be generally trapezoidal shaped, said trapezoid having two parallel sides 36 and two other sides 38, wherein said other sides 38 comprise cutting surfaces, with said cutting surfaces oriented generally obliquely to said guide means, said parallel sides generally perpendicular to said guide means.

Figure 4:
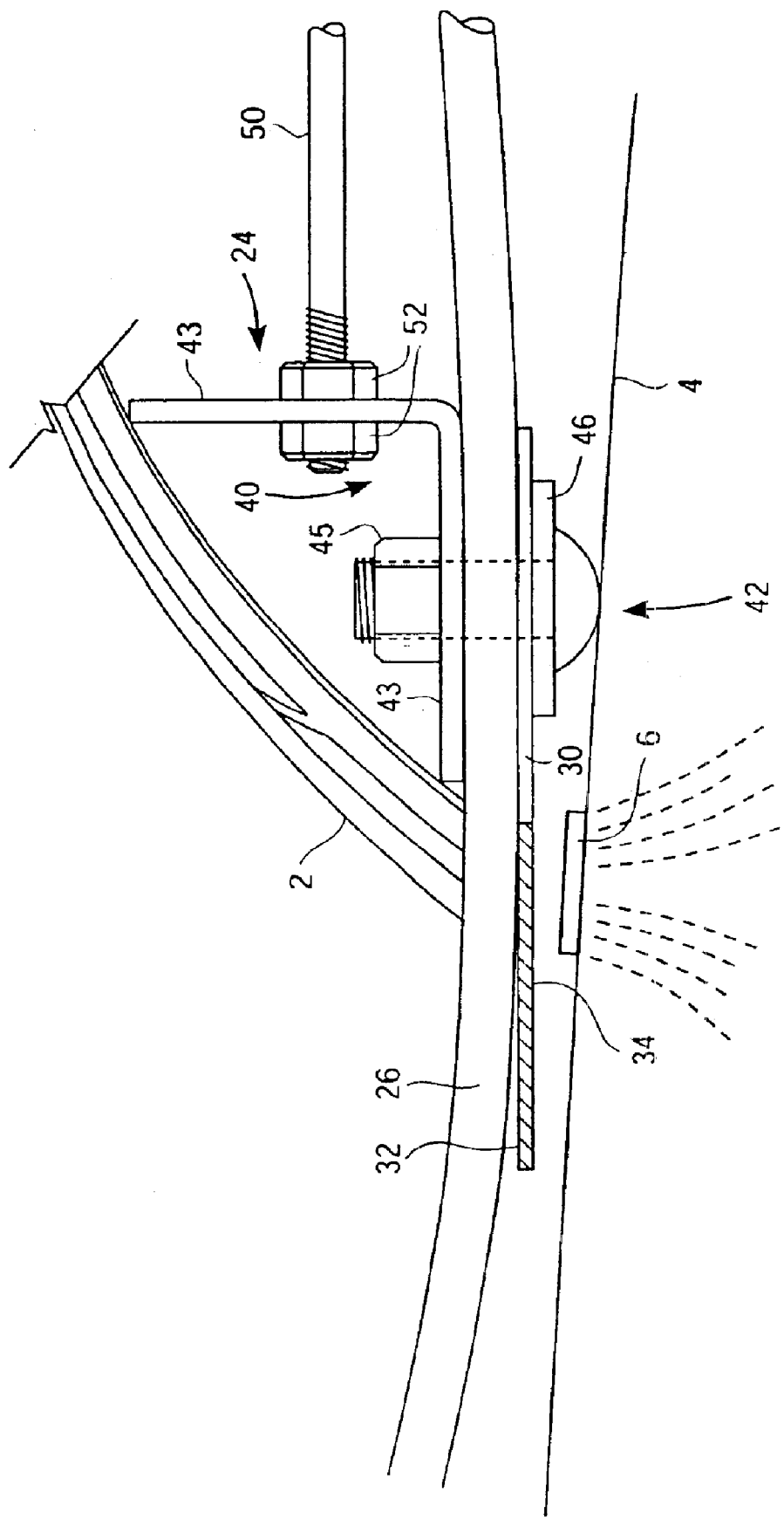
FIG. 4 is a partial environmental view of another embodiment of the present invention.

Referring to FIG. 4, a side view of the present invention in use is shown. In this view, one can see how the guide means 26 are in use, slid along the ground surface 4, thereby controlling the angle of attack of the cutting means 30 as it relates to the vegetation 2. This view shows the cutting means 30 after it has severed the vegetation from its stump and roots. In this view, one can see how the harvesting tray 40 is used to collect cut vegetation. This view also shows the harvesting means 24 in greater detail. In this view, one can see the top bar 43 attaching to the cutting means 30 through use of a fastener means 45 with the guide prongs 26 extending there between. In this embodiment, a bottom bar 46 is utilized to assist in the attachment to the cutting means 30.

The device is used by sliding the guide means along a ground surface. As the guide means 26 slide, vegetation enters the cutting means 30 and is cut. Severed plant matter piles up on the device, particularly stacking against the harvesting tray. After the user has made sufficient cutting passes, the user is able to lift the device off the ground, carry it to a desired location, and dump the stacked plant matter into a pile or container. The cutting action is facilitated through the vegetation sliding between the guide means and the cutting edges of the cutting means. When the vegetation reaches the valley of the harvesting means, the vegetation becomes pinched between the blade and the guide means and is easily cut by the blade.

Figure 5:
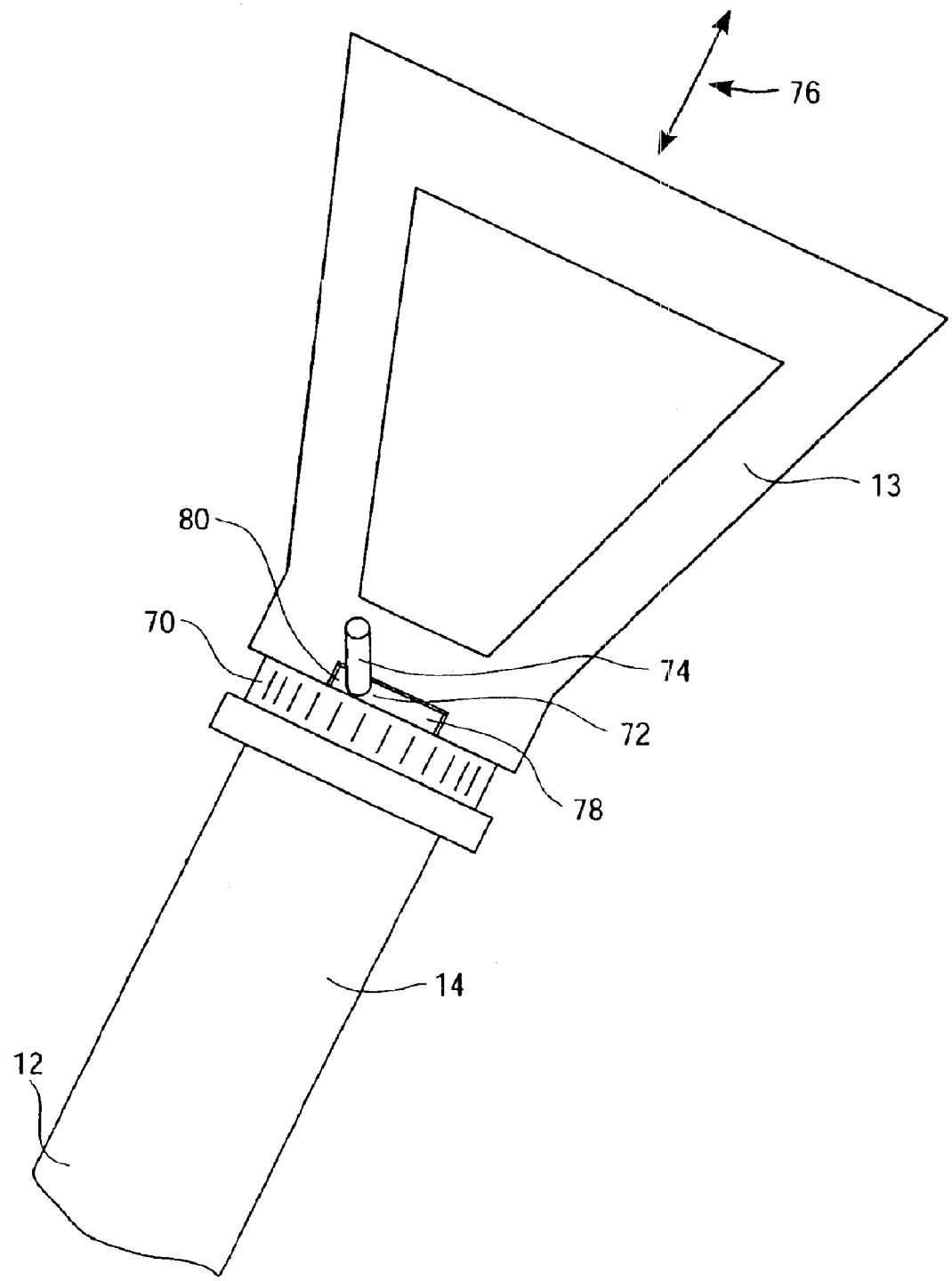
FIG. 5 is a perspective view of the handle of one embodiment of the present invention.

FIG. 5 illustrates a perspective view of one handle 12 of the present invention. Handle grip 13 is preferably coupled with the first end 14 of handle 12, and may be secured thereto by handle grip clamp 70. Handle grip 13 further includes a handle grip aperture 72 adapted to receive a handle pin 74 therein. Handle pin 74 is coupled with first end 14 of handle 12, and extends radially from first end 14 into handle grip aperture 72. Handle grip 13 is rotatably coupled with the first end 14 of handle 12, whereby handle grip 13 may be rotated about a longitudinal axis 76 of handle 12, longitudinal axis 76 being an axis corresponding to the center of rotation of handle grip 13. Rotation of handle grip 13 about axis 76 in a clockwise direction will consequently move a first side 78 of handle grip aperture 72 toward handle pin 74. Likewise, rotation of handle grip 13 about axis 76 in a counter clockwise direction will consequently move a second side 80 of handle grip aperture 72 toward handle pin 74.

By effecting rotation of the handle grip 13 about axis 76, a user of the tool may choose a desired handle grip configuration that is ergonomically suited to the user's particular needs. The handle grip 13 can be rotated about axis 76 to form an angle relative to a plane defined by the parallel tines of the working end. The degree of rotation provided by the invention can vary, according to the needs of the user. For example, the handle may rotate ±10°, ±15°, ±20°, or ±25° about either side of the plane. In another embodiment, the degree of rotation is calculated with reference to the position of the handle pin. Accordingly, the handle grip may be configured with a wide range of rotatability, in order to accommodate the axis of wrist rotation. The degree or rotatability of the handle grip may depend on the height of the user, the length of their arm, or both. The handle grip may be freely rotatable throughout the range of rotation, and the handle grip may be fixed at any desired angle within the range of rotation.

Figure 6:
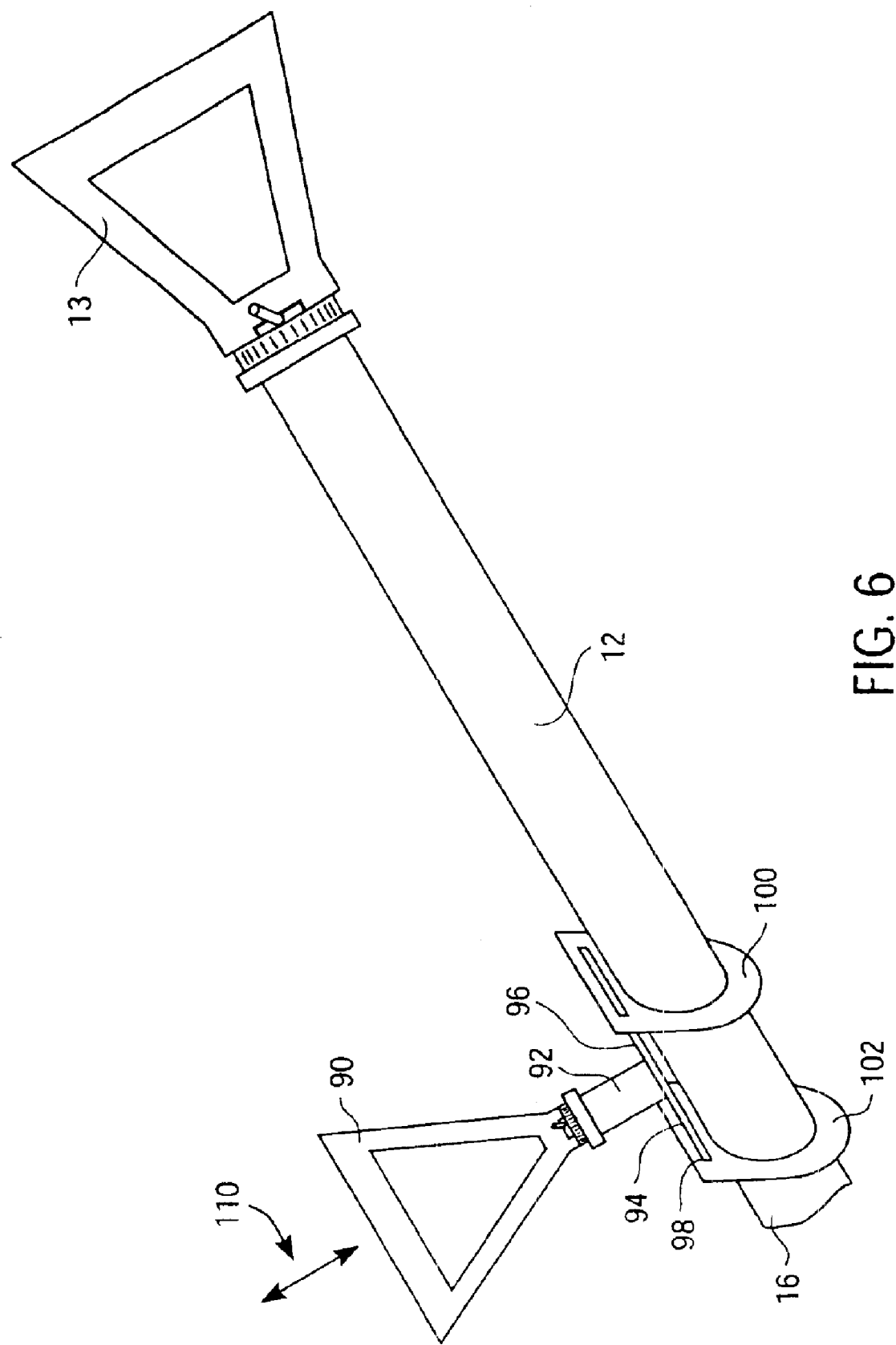
FIG. 6 is a partial perspective view of another embodiment of the invention.

FIG. 6 illustrates a partial perspective view of the handle 12 of the present invention. A working end handle grip 90 is preferably rotatably coupled with handle 12, toward the second end 16 of handle 12. The working end handle grip 90 can further include a handle grip stem 92, which is coupled with a stem base 94. Stem base 94 includes a proximal end 96 and a distal end 98. Stem base proximal end 96 is coupled with a proximal handle clamp 100, and stem base distal end 98 is coupled with a distal handle clamp 102. Both the proximal handle clamp 100 and the distal handle clam 102 are coupled with handle 12. Working end handle grip 90 may further be rotatably coupled to the handle grip stem 92 similar to the way handle grip 13 is shown as rotatably coupled to handle 12 in FIG. 5.

The working end handle grip 90 can be rotated about an axis 110 to form an angle relative to the plane defined by the handle grip stem 92 and the handle 12. Axis 110 can be perpendicular to the longitudinal axis of handle 12. Again, the degree of rotation provided by the invention can vary, according to the needs of the user. For example, the working end handle grip may rotate ±10°, ±15°, ±20°, or 25° about either side of the plane. In another embodiment, the degree of rotation is calculated with reference to the position of the handle pin. Accordingly, the working end handle grip may be configured with a wide range of rotatability, in order to accommodate the axis of wrist rotation. The degree or rotatability of the working end handle grip may depend on the height of the user, the length of their arm, or both. The working end handle grip may be freely rotatable throughout the range of rotation, and the working end handle grip may be fixed at any desired angle within the range of rotation.

In use, the working end handle grip 90 provides the tool user with multiple benefits. For example, the user does not need to reach down so far when grasping the working end handle grip 90, as compared to when the user grips the handle 12 itself. Subsequently, the user may experience less strain or discomfort to their back. Further, since the working end handle grip 90 can be rotatably coupled with the handle 12, the user has the freedom to adjust the orientation of the working end handle grip 90 to an ergonomically desirable position, thereby reducing strain or discomfort to their wrist and forearm. This can be particularly effective when using the tool in highly repetitive tasks, or when managing heavy materials.

The working end handle grip 90 also allows the user to grip the tool with higher degree of control, as the tool is less likely to slip or rotate during use. The user may also adjust the locations of the proximal handle clamp 100 and the distal handle clam 102, so as to position the working end handle grip 90 on any desired site along the handle 12. For example, the working end handle grip may be coupled with the handle 12 at a site located more toward the second end 16 of the handle. Alternatively, the working end handle grip 90 may be coupled with the handle 12 at a site located more distant from the second end 16 of the handle. This allows the user to have more control over the balancing of the load carried by the tool, and the position may be adjusted depending on the task for which the tool is being used. Additionally, the distal handle clamp 102 may also be configured to further secure the working end implement, such as the fork 11 (shown in FIG. 1) to the handle 12.

While the figures show use of a four-tine fork, any other type of numbered fork may also work, for instance a three-tine fork, a five-tine fork, or others. The fork and handle may also be a standard pitchfork. The position of the top bar and bottom bar can be adjusted by sliding along the tines, to achieve the desired angle for a particular task. Additionally, the handle grip 13 and the working end handle grip 90 may be coupled with the handle at any desired angle. For instance, while handle grip 13 will generally be oriented along the longitudinal axis of handle 12, it may also be oriented at a jointed angle with respect to the longitudinal axis of handle 12. Similarly, while working end handle grip 90 will usually be oriented along the longitudinal axis of the handle grip stem, it may also be oriented at a jointed angle with respect to the longitudinal axis of handle grip stem 92.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A tool comprising:
an elongated handle having a first end and a second end,
a working end coupled with the second end,
a first end handle grip rotatably coupled with the first end, and
a working end handle assembly coupled with the second end of the elongated handle,
wherein the working end handle assembly comprises a working end handle end, a working end handle grip stem coupled with the handle grip, a stem base coupled with the handle grip stem, the stem base comprising a proximal end and a distal end, a proximal handle clamp coupled with the stem base proximal end, and a distal handle clamp coupled with the stem base distal end, such that the proximal handle clamp and the distal handle clamp are configured for attachment with the working end of the handle of the tool.

2. The tool of claim 1, wherein the first end handle grip is rotatable about a longitudinal axis of the handle.

3. The tool of claim 1, wherein the elongated handle first end further comprises a handle pin extending therefrom, and the rotatable first end handle grip further comprises a handle grip aperture adapted to receive the handle pin therein.

4. The tool of claim 1, wherein the first end rotatable handle grip is fixable.

5. The tool of claim 1, wherein the rotatable first end handle grip is secured to the handle with a handle grip clamp.

6. The tool of claim 1, wherein the working end includes a harvesting head comprising a plurality of elongated, curved tines arranged in a side by side configuration.

7. The tool of claim 1, wherein the working end handle grip is rotatable about an axis perpendicular to a longitudinal axis defined by the handle.

8. The tool of claim 1, wherein the working end handle grip is rotated to define an angle with the plane defined by the handle grip stem and the handle.

9. The tool of claim 1, wherein the working end handle grip is fixable.

10. The tool of claim 1, wherein the working end handle grip may rotate up to approximately ±25° about either side of a plane defined by the handle grip stem and the handle.

11. The tool of claim 6, wherein each tine has a first end, a second end, and a middle portion, the plurality of tines having generally parallel middle portions and generally parallel first ends, the second ends joining to adjacent tine second ends and coupled with said elongated handle.

12. The tool of claim 11, further comprising at least one cutting blade interposed between adjacent tines.

13. The tool of claim 11, wherein the first end handle grip may rotate up to approximately ±25° about either side of a plane defined the parallel tines of the working end.

14. The tool of claim 12, further comprising a bar coupled with the at least one cutting blade.

15. The tool of claim 14, further comprising a reinforcing rod coupled with the bar and with the second end of at least one tine.

16. A working end handle assembly for attachment with a working end of a handle of a tool, the working end handle assembly comprising:

a) a working end handle grip;
b) a working end handle grip stem coupled with the handle grip;
c) a stem base coupled with the handle grip stem, the stem base comprising a proximal end and a distal end;
d) a proximal handle clamp coupled with the stem base proximal end; and
e) a distal handle clamp coupled with the stem base distal end,
wherein the proximal handle clamp and the distal handle clamp are configured for attachment with the working end of the handle of the tool.

17. The working end handle assembly of claim 16, wherein the working end handle grip is rotatably coupled with the handle grip stem.

18. The working end handle assembly of claim 17, wherein the working end handle grip is rotatable about an axis perpendicular to a longitudinal axis defined by the handle.

19. The working end handle assembly of claim 16, wherein the working end handle grip is rotated to define an angle with the plane defined by the handle grip stem and the handle.

20. The working end handle assembly of claim 19, wherein assembly is configured to allow the handle grip to rotate ±10° about either side of the plane.

21. The working end handle assembly of claim 19, wherein assembly is configured to allow the handle grip to rotate ±15° about either side of the plane.

22. The working end handle assembly of claim 19, wherein assembly is configured to allow the handle grip to rotate ±20° about either side of the plane.

23. The working end handle assembly of claim 19, wherein assembly is configured to allow the handle grip to rotate ±25° about either side of the plane.

24. The working end handle assembly of claim 16, wherein the working end handle grip is fixable.

25. The working end handle assembly of claim 16, wherein the working end handle grip may rotate up to approximately ±25° about either side of a plane defined by a handle grip stem and the handle.

26. The work end handle assembly of claim 16, wherein the assembly further comprises a working end handle pin coupled with the handle grip stem, and the working end handle grip further comprises a working end handle grip aperture adapted to receive the working end handle pin.

27. The working end handle assembly of claim 22, wherein the working end handle grip is secured to the handle grip stem by a working end handle grip clamp.

* * * * *